United States Patent [19]
Ross

[11] Patent Number: 5,235,579
[45] Date of Patent: Aug. 10, 1993

[54] COMPACT DISC STORAGE RETRIEVAL AND LOADING DEVICE

[75] Inventor: Lorne Ross, Toronto, Canada
[73] Assignee: Cyberkinetics Ltd., Toronto, Canada
[21] Appl. No.: 493,805
[22] Filed: Mar. 15, 1990
[51] Int. Cl.⁵ .................. G11B 17/08; G11B 17/22; G11B 17/26
[52] U.S. Cl. .................. 369/37; 369/36; 369/178; 369/196; 360/98.06
[58] Field of Search .............. 369/34, 36, 37, 38, 369/39, 77.1, 75.1, 178, 196; 360/97.03, 98.01, 98.04, 98.06

[56] References Cited

U.S. PATENT DOCUMENTS

| | | | |
|---|---|---|---|
| 3,183,005 | 5/1965 | Rockola | 274/10 |
| 4,633,452 | 12/1986 | Shimbo et al. | 369/39 |
| 4,635,150 | 1/1987 | Kato et al. | 369/37 X |
| 4,695,990 | 9/1987 | Kawakami | 369/38 |
| 4,750,160 | 6/1988 | Miller et al. | 369/37 |
| 5,022,020 | 6/1991 | Langman et al. | 369/37 |
| 5,105,414 | 4/1992 | Funabashi et al. | 369/77.1 |

FOREIGN PATENT DOCUMENTS

| | | |
|---|---|---|
| 169597 | 1/1986 | European Pat. Off. |
| 357814 | 3/1990 | European Pat. Off. |
| 2610755 | 2/1987 | France |
| 8601631 | 3/1990 | PCT Int'l Appl. |
| 2118758 | 11/1983 | United Kingdom |

OTHER PUBLICATIONS

Arnolds, Friedrick: "Elektronische MeBtechnik", 1. Auflage, Verlag, Berliner Union, 1976, pp. 269-271.

Primary Examiner—Stuart S. Levy
Assistant Examiner—Joseph A. Rhoa
Attorney, Agent, or Firm—Sim & McBurney

[57] ABSTRACT

A remote controlled compact disc loader including a housing of predetermined dimensions for supporting a compact disc player, incorporating a carousel (11) for storing a plurality of compact discs (7) in circular arrangement, circuitry for locating predetermined compact discs stored in the carousel, an extraction device (15) for removing successive predetermined compact discs, a mechanism for opening the disc carrying tray (19) of the compact disc player, an arcuate arm (5) for grasping the predetermined compact discs and lifting individual discs to a position immediately over the opened disc carrying tray and releasing the disc into the tray (19), and a device for closing the disc carrying tray. Electronic circuitry is included for recording the play duration of each compact disc, and for effecting sequential automatic retrieval and loading of a user selected sequence of compact discs into the compact disc player. Gripper elements (103a, 103b) extend from a gripper (9) which grabs the CD (7).

6 Claims, 14 Drawing Sheets

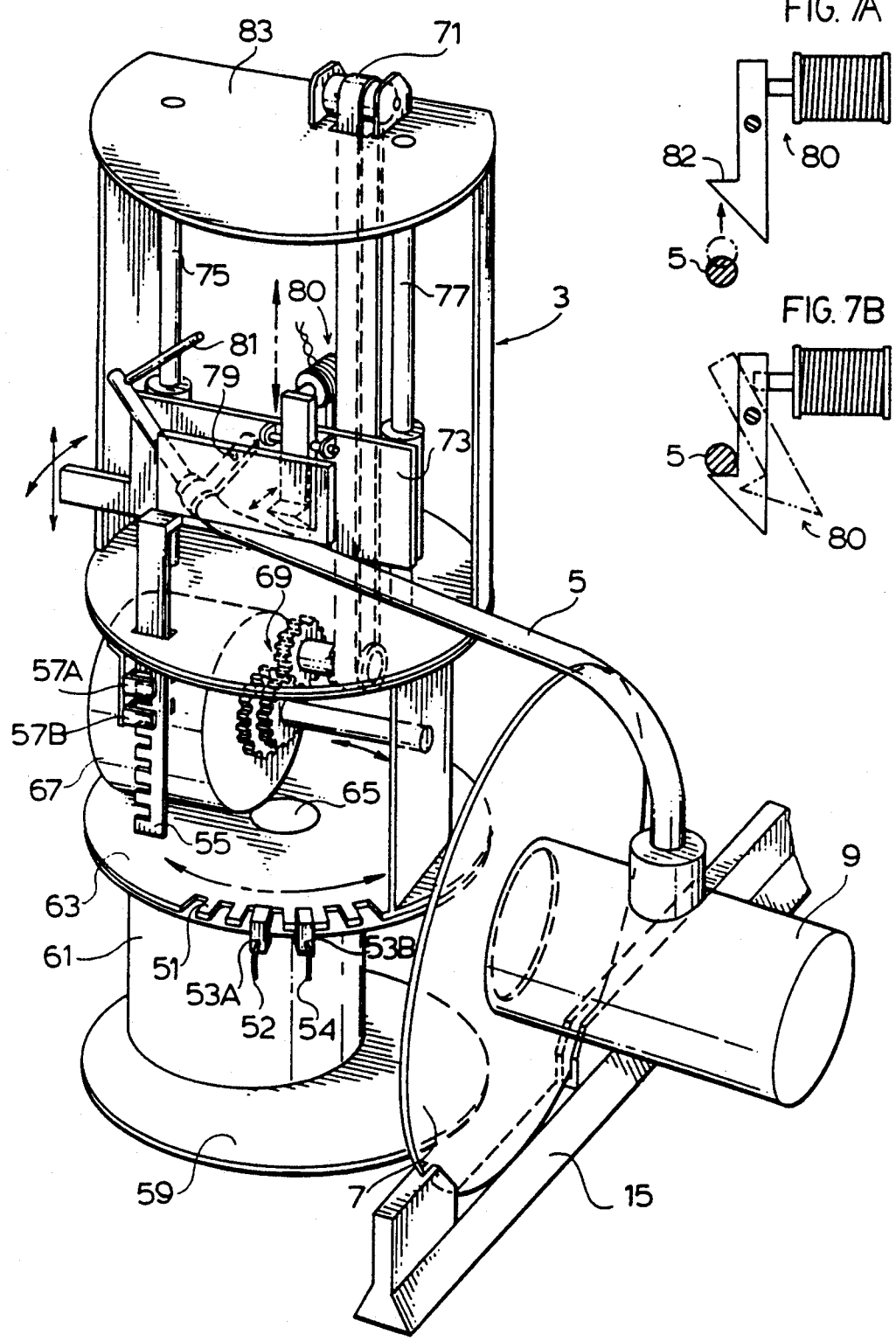
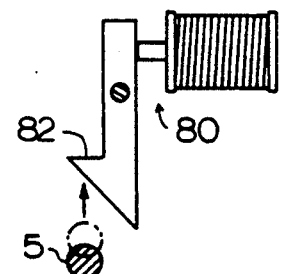
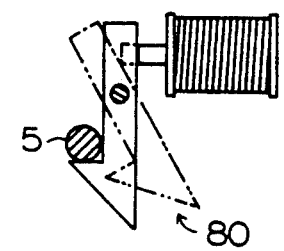
FIG. 7
FIG. 7A
FIG. 7B

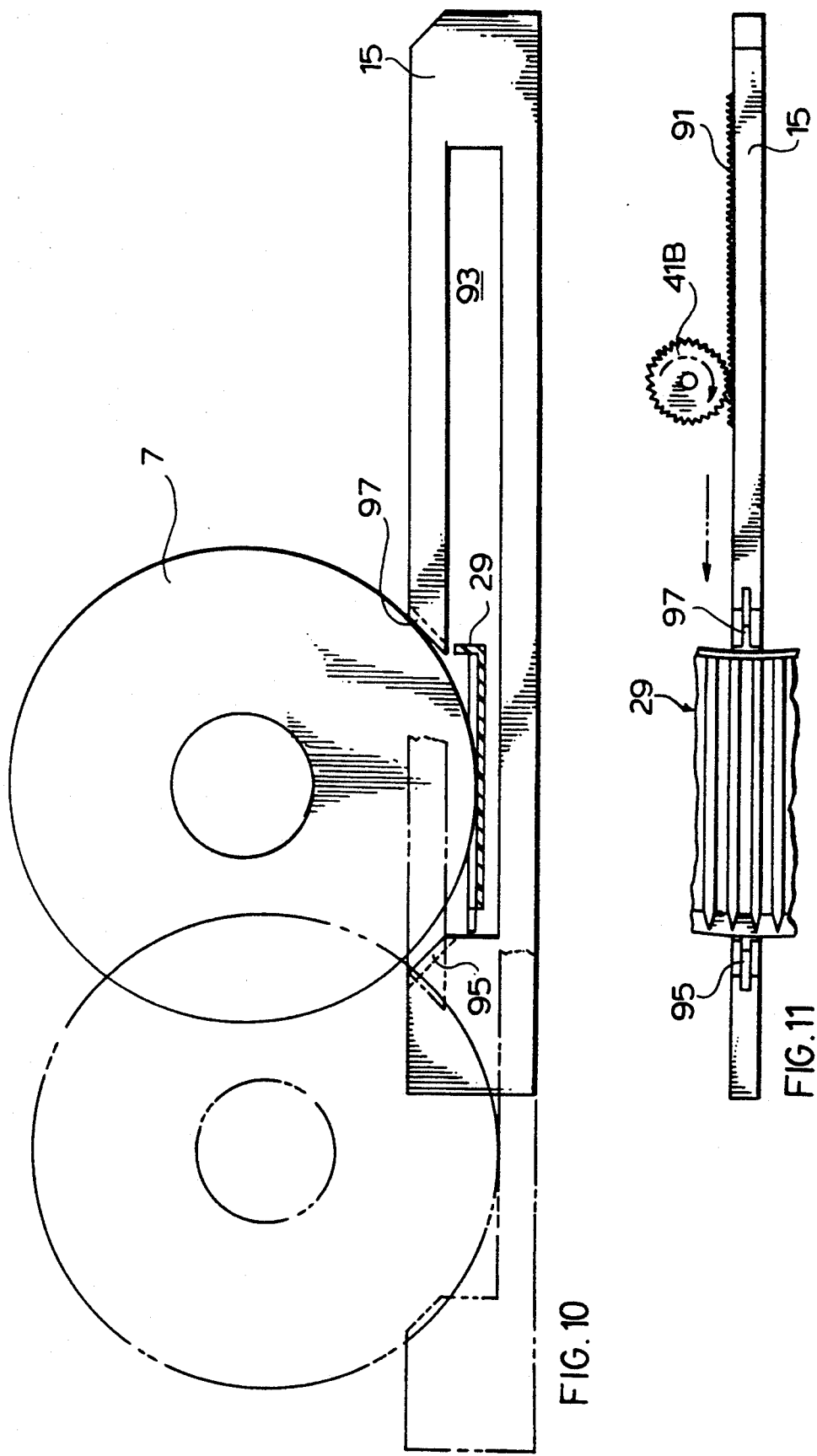

COMPACT DISC STORAGE RETRIEVAL AND LOADING DEVICE

FIELD OF THE INVENTION

This invention relates in general to storage and retrieval devices, and more particularly to a remote controlled compact disc loader.

BACKGROUND OF THE INVENTION

It is desirable in using modern day compact disc players, to facilitate sequential playing of a plurality of compacts discs for continuous playing. Heretofore, audio enthusiasts have resorted to expensive and complex multiple disc players. For example, Sony Corporation presently sells a compact disc player having a turntable for supporting four compact discs which may be played in sequence.

Alternatively, integral compact disc storage and player devices are disclosed in U.S. Pat. No. 4,754,445 (Litton) and U.S. Pat. No. 4,750,160 (Kubik Enterprises). According to these latter systems, a CD player device is mounted centrally within a storage unit and operates integrally with the storage and retrieval unit.

A disadvantage of the former prior art system is that only a limited number of compact discs may be stored for sequential play.

A disadvantage of the latter prior art systems, is that the C player is made integral with the storage and retrieval unit. Thus, stand-alone compact disc players are not accommodated in such systems.

SUMMARY OF THE INVENTION

According to the present invention, a compact disc loader is provided for retrofit operation with existing compact disc players. In particular, the compact disc loader of the present invention comprises a housing which supports a standard size of compact disc player, and incorporates apparatus for opening and closing the compact disc tray of the player responsive to user commands.

Compact discs are stored in toroidal arrangement on a carousel within the housing, and are selectively extracted and lifted to a position immediately above the open tray. The compact disc is then dropped into the open tray, the loader then closes the tray door, and then an infrared transmitter mounted to the loader generates control signals for initiating a play sequence of the compact disc player.

In this way, a large number of compact discs may be stored for sequential play (up to 500 discs according to the preferred embodiment).

The compact disc loader of the present invention is considerably less complex and costly than the above discussed latter mentioned prior art systems, yet offers the advantages of storage and programmed play sequences of such prior art systems above and beyond the limited storage capacity of the former prior art systems discussed above. Furthermore, the loader of the present invention is adapted to accommodate stand-alone CD players of standard dimensions.

In general, according to an aspect of the present invention, there is provided a compact disc storage and retrieval device, comprising:

a) a housing for supporting a compact disc player;
b) means within said housing for storing a plurality of compact discs; and
c) user responsive means for retrieving a predetermined one of said plurality of compact discs from said means for storing, loading said predetermined compact disc into said player, and generating predetermined control signals for controlling operation of said compact disc player.

BRIEF DESCRIPTION OF THE DRAWINGS

A preferred embodiment of the present invention will be described in greater detail below with reference to the following drawings, in which:

FIG. 7 is a detail view of a rotating tower, arcuate arm and drive mechanisms in accordance with the preferred embodiment;

FIGS. 7A and 7B illustrate the principles of operation of an arm lock of the rotating tower;

FIGS. 10 and 11 are elevation and plan views respectively showing details of operation of the extractor arm in accordance with the preferred embodiment;

FIGS. 16A1, 16A2, and 16B1, 16B2, 17 and 18 are schematic diagrams illustrating electronic control circuitry in accordance with preferred embodiment.

DETAILED DESCRIPTION OF THE INVENTION

Figure 1:
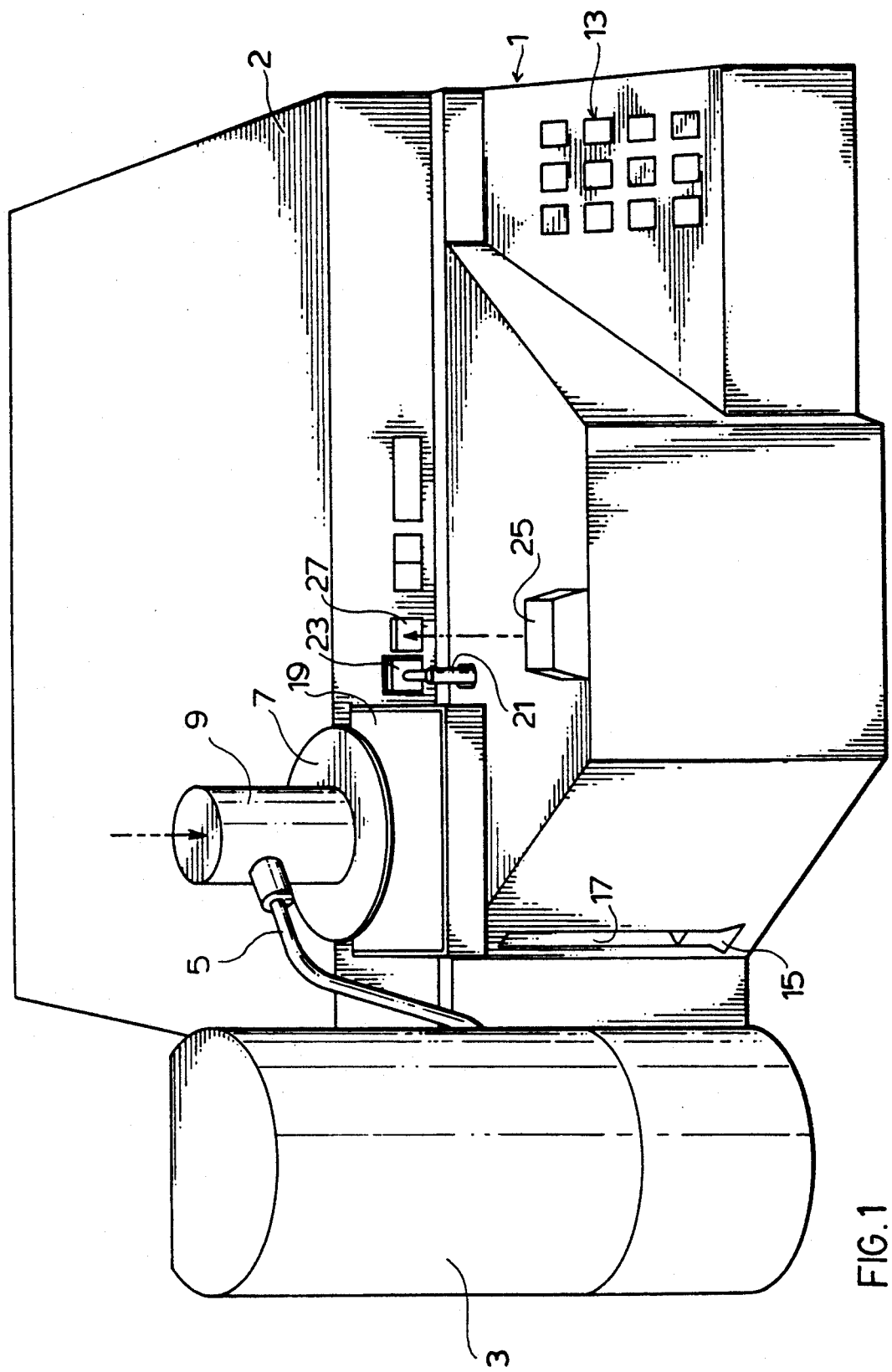
FIG. 1 is a front perspective view of the compact disc loader in accordance with the preferred embodiment.

Turning to FIG. 1, the compact disc loader of the present invention is shown comprising a housing 1 for supporting a standard compact disc player 2. The dimensions of the housing 1 are predefined to adequately support the CD player 2. The loader further comprises a moveable tower 3 having an arcuate arm 5 extending therefrom. A compact disc 7 is shown being grasped by a grabber mechanism 9.

Figure 2:
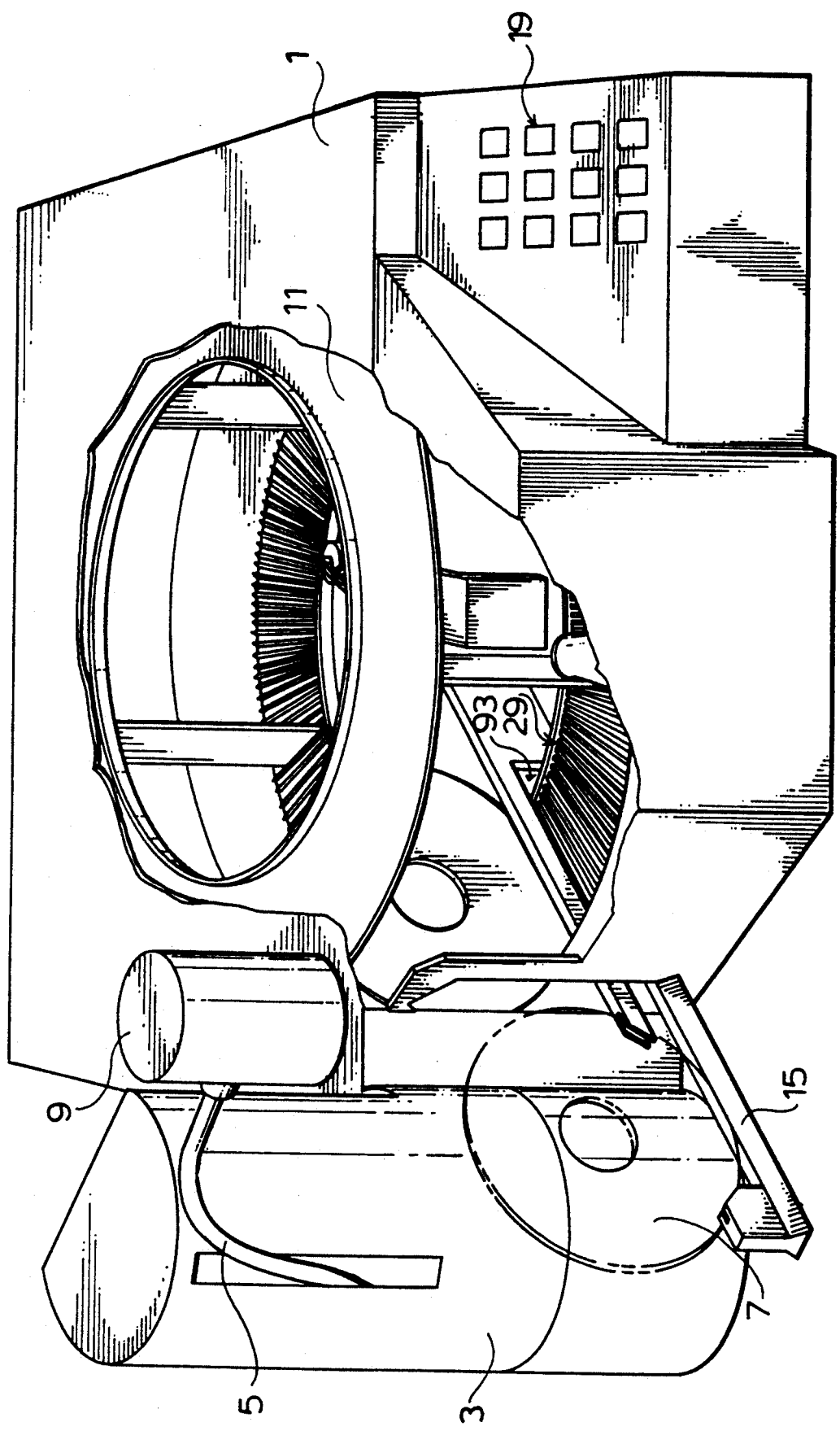
FIG. 2 is a partially broken front perspective view of the invention shown in FIG. 1 with extraction arm fully extended.

As shown in greater detail with reference to FIG. 2, the housing 1 incorporates a carousel 11 for storing a plurality of compacts discs, such as compact disc 7. In accordance with the successful prototype, carousel 11 was configured to store 250 compact discs. As will be described in greater detail below, the compact disc loader of the present invention is programmed in accordance with the compact discs loaded therein, to store the duration of play for each compact disc as well as the location of each compact disc on the carousel 11.

In operation, with reference to FIGS. 1 and 2, a user programs a predetermined play sequence of compact discs by means of a key pad 13 or remote control device (not shown). In response, the compact disc loader of the present invention locates the first selected compact disc 7 stored on carousel 11, and extracts the compact disc by means of a horizontal extraction arm 15. More particularly, as will be discussed in greater detail below with reference to FIGS. 5 and 6, in the retracted position, the plurality of compact discs mounted on carousel 11 pass through an opening in the arm 15. However, upon advancing the horizontal arm 15 radially outward from the carousel 11, the selected compact disc 7 falls into the aforementioned opening and is moved through an aperture 17 to a position outside of the housing 1, as shown in FIG. 2.

Next, the gripping mechanism 9 of arcuate arm 5 grasps the selected compact disc 7 from its vertical orientation on horizontal extractor arm 15, and raises and rotates the compact disc 7 to a horizontal position.

The compact disc loader of the present invention then causes the compact disc carrying tray 19 of CD player 2 to open. As will be described in greater detail below with reference to FIG. 9, the compact disc loader of the present invention includes an axial rod having an extension 21 thereof, for depressing a tray open/close button 23 of the CD player 2.

The arm mechanism and the grabber mechanism 9 releases compact disc 7 such that the compact disc descends squarely onto the open tray 19. Next, the compact disc loader depresses button 23 of player 2 for closing the drawer or tray 19.

Finally, the compact disc loader generates one or more control signals via an infrared transmitter 25 for controlling operation of the compact disc player 2. More particularly, the transmitter 25 is aimed at an infrared remote control receiver 27 of the CD player 2, as is normally provided on such apparatus.

As discussed above, the duration or play time for each compact disc is stored within memory of the compact disc loader such that, upon expiration of the predetermined elapsed duration time of the disc being played, the CD player 2 is assumed to have finished playing disc 7, and the CD loader of the present invention executes a disc retrieval process following a reverse of the sequence described above. Namely, the CD loader of the present invention effects opening of the door for tray 19, removal of the compact disc 7 therefrom by means of grabber mechanism 9, replacement of the compact disc 7 on horizontal extraction member 15, retraction of horizontal member 15 within housing 1 and restoring the compact disc 7 at the correct location on carousel 11.

The compact disc loader then locates the next compact disc in the programmed play sequence, retrieves the said disc, loads the disc into compact disc player 2 and initiates playing of the compact disc via infrared transmitter 25, as discussed above. The procedure is repeated until the entire user-programmed play sequence is completed.

Figure 3:
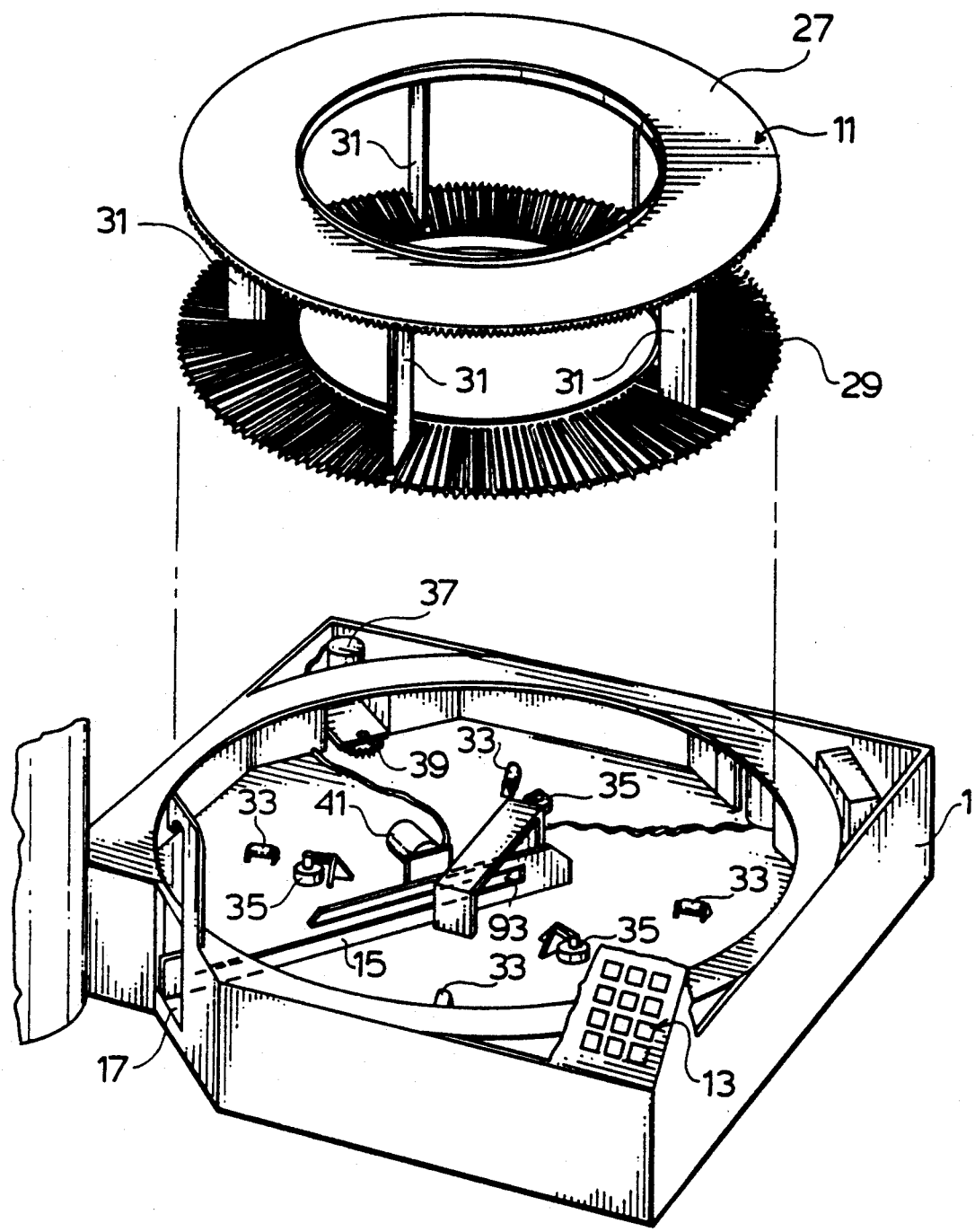
FIG. 3 is a partly broken exploded perspective view of a carousel and extractor portion of the invention.
Figure 4:
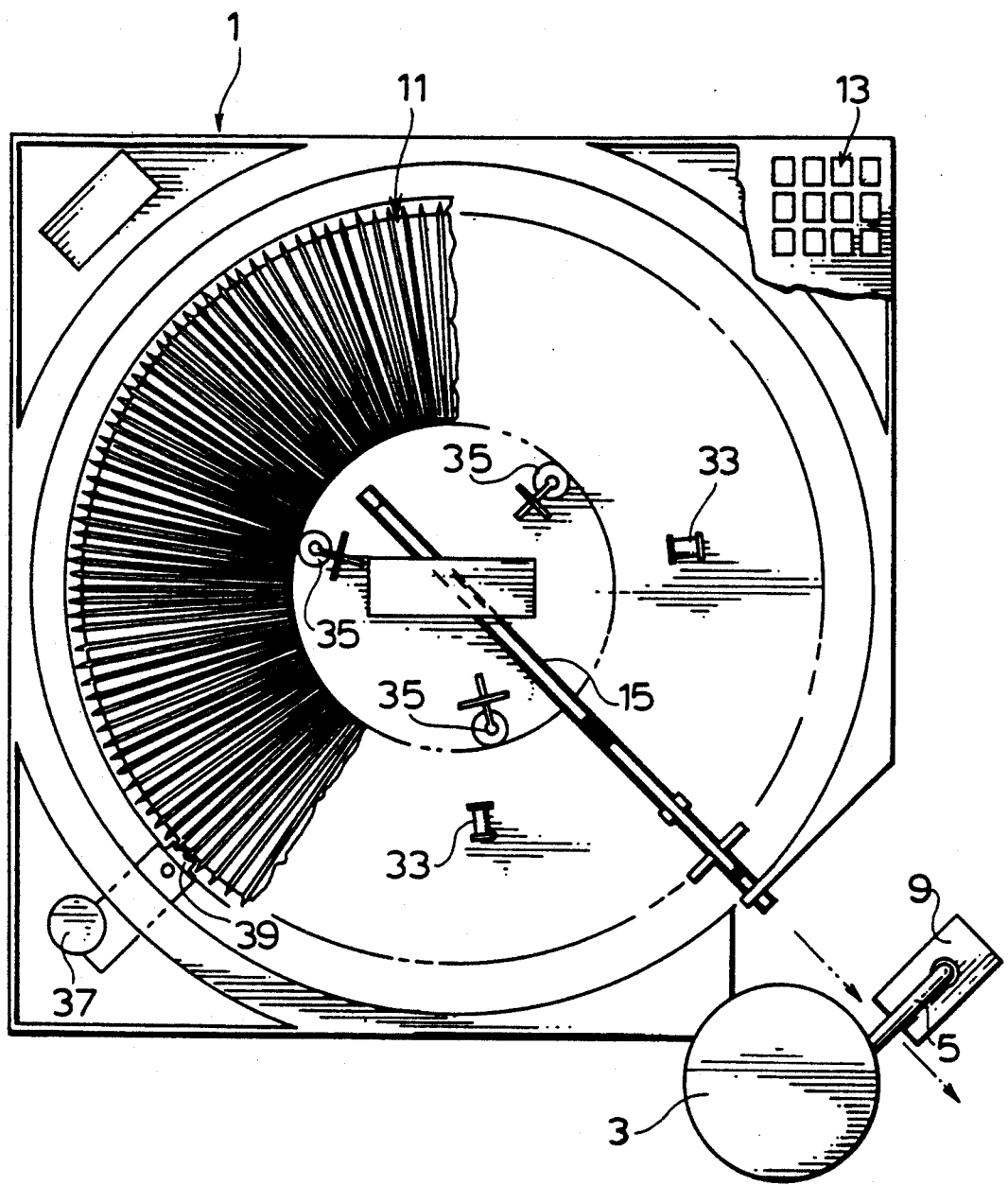
FIG. 4 is a partly broken plan view of the compact disc loader of the preferred embodiment.

Turning to FIGS. 3 and 4, the housing 1, carousel 11 and horizontal extraction member 15 are shown in greater detail. In particular, carousel 11 is shown comprised of top and bottom toroidal discs 27 and 29, each provided with a plurality of radial slots for storing compact discs. The toroidal discs 27 and 29 are separated by supporting members 31.

The carousel 11 is mounted within housing 1 on a series of horizontal and vertical rollers 33 and 35, and is rotated by means of a DC motor 37 operating a toothed wheel 39.

The horizontal extraction member 15 is mounted within housing 1 for radial sliding movement under control of a DC motor 41.

According to an aspect of the present invention, the location and speed of movement of carousel 11, horizontal extraction member 15, rotating tower 3 and moveable arcuate arm 5 are controlled via optical sensors. In particular, with reference to FIGS. 5, 6 and 7, respective pairs of optical sensors are shown disposed over corresponding slotted tracks attached to the various moving mechanisms of the CD loader.

Figure 5:
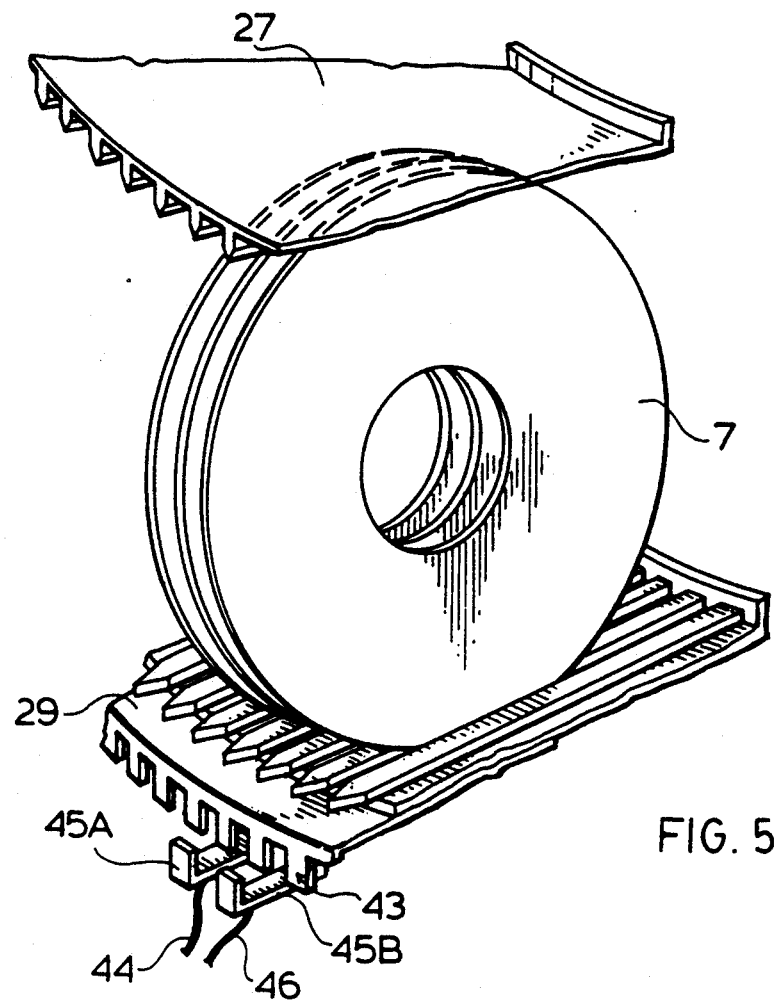
FIG. 5 is a detail of a portion of the carousel in accordance with the preferred embodiment.

With reference to FIG. 5, a circumferentially arranged track 43 is shown extending downwardly of the perimeter of disc 29. The track 43 also engages the teeth of wheel 39 (FIGS. 3 and 4) for rotating carousel 11. A pair of optical interrupter switches 45A and 45B are mounted across the moving slotted track 43 resulting in a succession of pulse signals being generated by the switches for output via respective leads 44 and 46 to the CD loader control circuitry, as discussed below with reference to FIGS. 16A and 17.

The electronic circuitry of the present invention counts the pulse signals generated by interrupter switches 45A and 45B for determining the location of the carousel 11 relative to a predetermined starting position of the carousel 11 which is defined by an extended slot (not shown) extending between both switches 45A and 45B.

According to the preferred embodiment illustrated in FIG. 5, the optical interrupter switches 45A and 45B are spaced apart by 1.5 slots (i.e. in the position of the slotted track 43 shown in FIG. 5, switch 45A is located on opposite sides of a tooth of the track 43 whereas switch 45B is located on opposite sides of a slot of the track 43 with one slot and one tooth separating the switches 45A and 45B). However, switches may be characterized more generally as (N/2)×slot pitch of track 43, where N is any odd number which is sufficiently large to accommodate the width of the optical interrupter switch. Thus, the effective positioning resolution of the dual optical sensor and slotted track arrangement of the present invention is equal to one-half times the slot pitch.

In operation, as the carousel 11 rotates, alternating slots and teeth of track 43 pass between the respective switches 45A and 45B causing the switches to generate respective pulse signals phase shifted by 180°. The arrangement of offset switches results in hardware "debouncing" of the optical sensing circuitry. In particular, the electronic circuitry discussed in greater detail below with reference to FIGS. 16A and B, is programmed to ignore mechanism jitter provided that the magnitude of the jitter is less than one-half of the slot pitch. In addition, a slight displacement of the carousel 11 when it is not being driven will likewise be ignored provided that the magnitude of displacement is less than one half of slot pitch. For example, in the event that the carousel 11 is halted such that a slot separates emitter and detector sides of the switch 45A, then any subsequent insignificant jostling or displacement of the carousel 11 will result in one or more pulses being generated by switch 45A whereas switch 45B will not generate a pulse until significant movement (i.e. deliberate movement) of the carousel 11 takes place. As discussed, the electronic circuitry of the present invention effectively ignores the erroneous pulses from switch 45A and simply waits for additional pulses from sensor 45B prior to counting.

In addition, since the slots of tracks 43 are equally spaced, the electronic circuitry of the present invention may calculate the speed of movement which is proportional to the frequency of the generated pulse signals.

Figure 6:
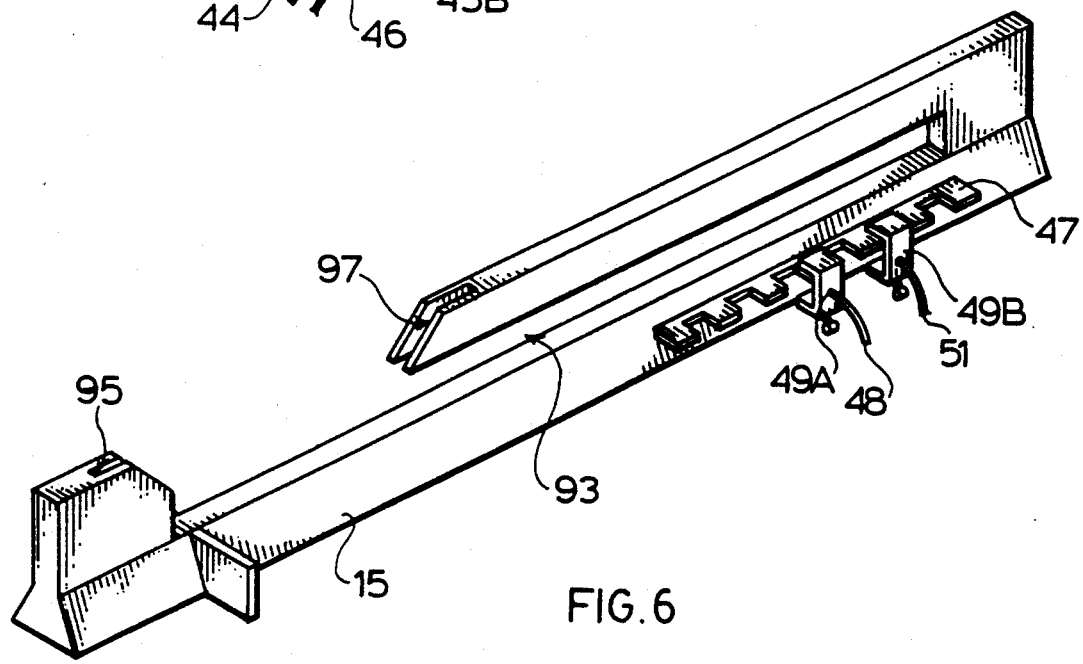
FIG. 6 is a detail of the extraction arm in accordance with the preferred embodiment.

The horizontal extraction arm 15 is shown in greater detail with reference to FIG. 6 comprising a linear slotted track 47 and optical interrupter switches 49A and 49B connected to the electronic circuitry (FIG. 16A) via respective leads 48 and 51. The slotted track 47 and associated interrupter switches 49A and 49B are configured in an identical manner as the slotted track and interrupters of FIG. 5, and operate the same way.

Turning to FIG. 7, a circular slotted track 51, optical interrupters switches 53A and 53B and associated leads 52 and 54 are shown for controlling location and speed of rotation the rotating vertical tower 3. Likewise, a linear slotted track 55, and optical interrupters switches 57A and 57B are shown with associated leads (not shown) for controlling position and speed of movement of the arcuate arm 5.

The tracks 51 and 55, and associated interrupter switches 53A, 53B and 57A, 57B operate in an identical manner as discussed above with reference to FIG. 5.

Figure 8:
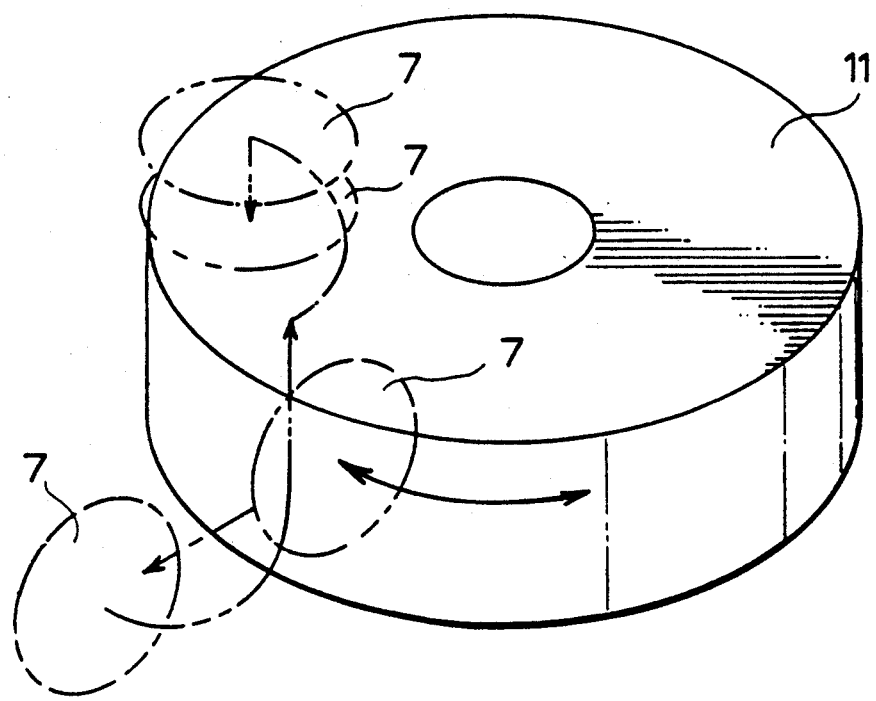
FIG. 8 is a schematic representation of the movement of a compact disc upon retrieval thereof and loading into a compact disc player.

Turning briefly to the schematic illustration of FIG. 8, the movement and orientation of compact disc 7 is shown during the extraction, lifting and loading manipulations performed in accordance with the present invention. More particularly, the disc 7 is shown in vertical orientation when stored in carousel 11 and when advanced radially outwardly of the carousel via the horizontal extractor arm 15. Upon lifting or raising of the compact disc 7 by the combined arcuate arm 5 and gripper mechanism 9, the disc moves from a vertical orientation to a horizontal orientation above the disc carrying tray 19 (FIG. 1). Then, as discussed above with reference to FIGS. 1 and 2, the disc is released from its horizontal orientation on the tray 19 to complete the loading procedure.

The vertical tower 3 is shown in greater detail in FIG. 7 comprising base portion 59 and DC motor 61 supporting a disc 63 which is mounted for rotation about an axis 65. An additional motor 67 is supported by disc 63 and includes a gear arrangement 69 connected to drive belt 71 which in turn is connected to an elevator mechanism 73 mounted for sliding vertical movement on posts 75 and 77.

The arcuate arm 5 is connected to elevating mechanism 73 via a hinge 79. The arcuate arm 5 also includes an extension member at a distal end thereof which contacts a top surface 83 of the tower 3 for causing rotation of the arcuate arm 5 for re-orienting the disc 7 from the vertical position to the horizontal position.

In order to hold the arm in a position such that the disc 7 is horizontal while lowering the disc into the tray or removing the disc therefrom, an solenoid operated arm lock 80 is connected to elevating member 73. As shown in FIGS. 7A and 7B, a detent portion 82 of the arm lock is adapted to support the arm 5 while it is being raised and lowered, thereby mounting the horizontal attitude of the compact disc 7. Upon disengagement of the arm lock 80 (dashed outline in FIG. 7b), raising and lowering of the arm 5 results in movement between horizontal and vertical orientations of the disc.

Figure 9:
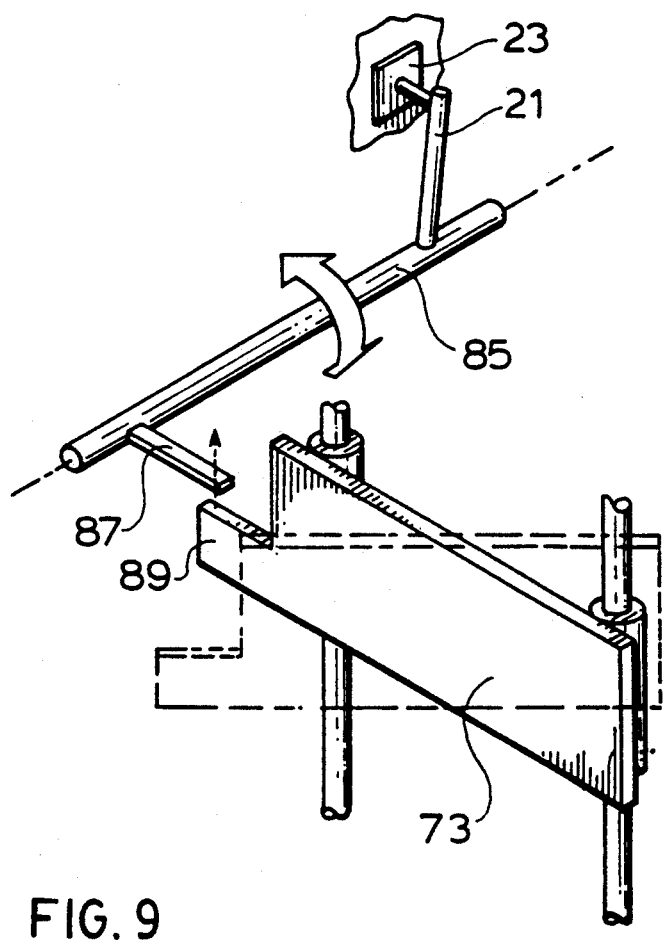
FIG. 9 is a detail view of a compact disc tray open/close mechanism.

FIG. 9 illustrates the compact disc player tray open/close device comprising axial rod 85 having extension members 21 and 87 extending therefrom. As shown, when the tower 3 is rotated to the fully clockwise extent of rotation, an extension portion 89 of elevating member 73 contacts and raises the extension 87 of rod 85 responsive to the elevating member 73 being raised via drive pulley or belt 71 and motor 67. Raising of extension 87 causes rotation of rod 85 which in turn causes extension 21 to depress the tray open/close button 23 of the compact disc player 2.

FIGS. 10 and 11 show operation of the extractor arm 15 in greater detail. In particular, radial sliding movement of arm 15 is effected by means of toothed wheel 41B connected to the DC motor 41 (FIG. 3) for engaging toothed rack 91 mounted to a side portion of the arm 15. The arm 15 includes a long rectangular aperture 93 opening into a space bounded by opposite grooved portions 95 and 97.

Returning briefly to FIG. 2, the bottom disc 29 of carousel 11 passes through the rectangular aperture 93 when the arm 15 is in either the retracted or extended position. Moreover, when in the retracted position, the bottom disc 29 of carousel 11 is located squarely at the opening bounded by grooved portions 95 and 97 (FIGS. 10 and 11). The vertical relationship between the opening of arm 15 and the disc 29 results in the peripheral edges of the compact disc 7 clearing either side of the opening (i.e. grooved portions 95 and 97).

However, upon sliding horizontal arm 15 to the extended position (shown in outline with reference to FIG. 10), the compact disc 7 is urged off of the slotted disc portion 29 via grooved portion 97 of the arm 15 and drops from the carousel 11 onto the arm 15 and is held in place by the grooved portions 95 and 97, as shown in dashed outline with reference to FIG. 10.

Next, arcuate arm 5 is lowered via motor 67 (FIG. 7) such that grabber mechanism 9 is positioned against the centre hub portion of the disc 7. Operation of the grabber mechanism 9 for grasping disc 7 is discussed in greater detail below with reference to FIGS. 14 and 15. The arcuate arm 5 is then lifted responsive to actuation of the motor 67 such that the attached compact disc 7 is raised in vertical orientation until extension 81 of arm 5 contacts the underside of surface 83 of the tower 3 (FIG. 7). Thereafter, additional raising motion of the elevating mechanism 73 causes the arcuate arm 5 to pivot around pivot point 79 such that the compact disc 7 is re-oriented from the vertical to horizontal position, as shown in dashed outline with reference to FIG. 12.

Figures 12, 13:
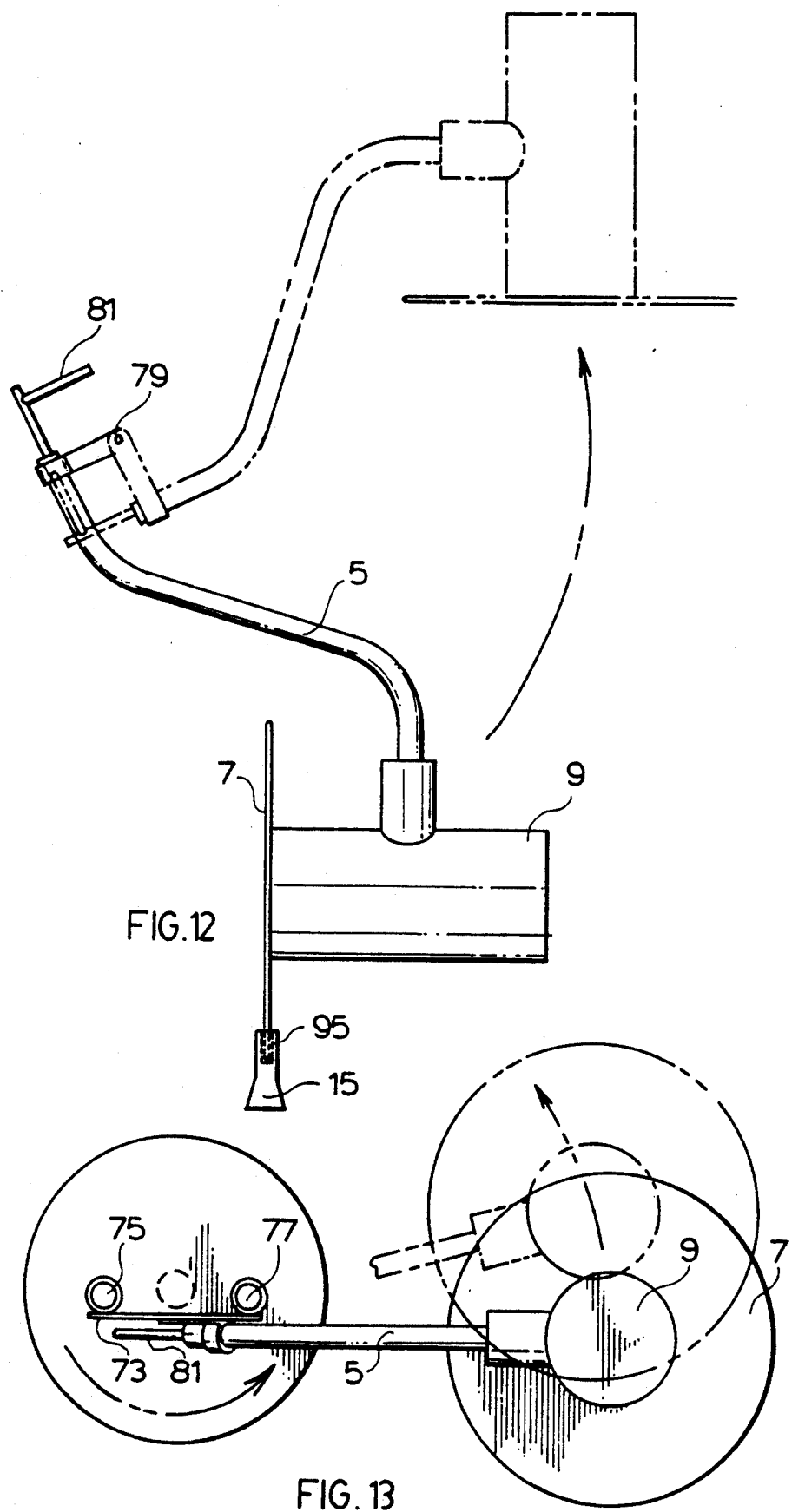
FIG. 12 is a partial elevation view showing movement of the arcuate arm in accordance with the preferred embodiment.
FIG. 13 is a partial plan view showing rotational movement of the tower in accordance with the preferred embodiment.

With the disc oriented in horizontal position as shown in FIG. 12, the tower 3 is rotated by means of DC motor 61 as shown in FIG. 13 for positioning the compact disc 7 over the opened tray 19 of CD player 2 (FIG. 1). The arm, locked in position via arm lock 80, then lowers the disc until it is on the tray.

Figure 15:
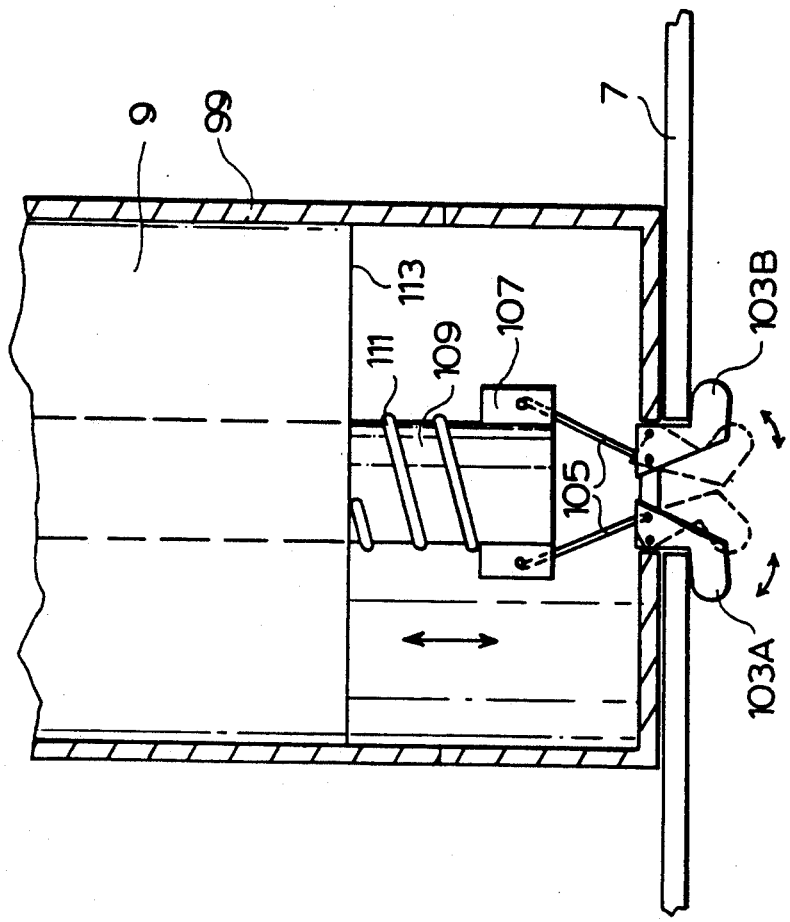
FIGS. 14 and 15 are detail perspective and cross sectional views, respectively of a grabber mechanism in accordance with the preferred embodiment.
Figure 14:
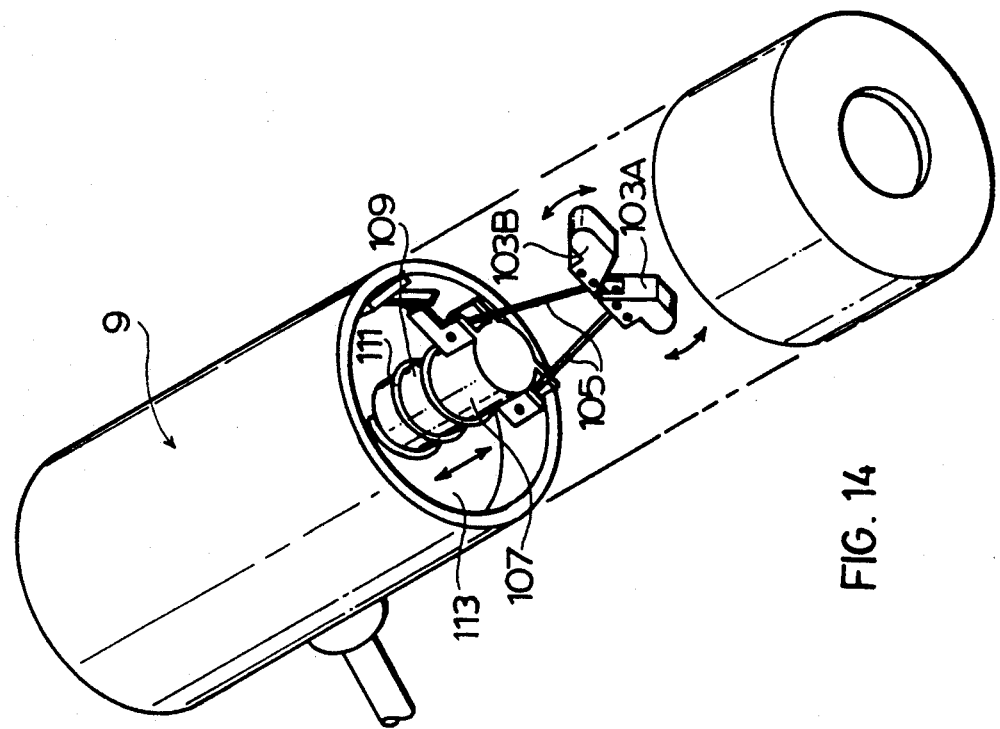

Turning to FIGS. 14 and 15, the grabber mechanism 9 is shown including an outer housing 99 having a circular aperture 101 at a remote end thereof. Extending through the aperture 101 are a pair of gripper elements 103A and 103B which are connected via rods 105 to connection points 107 of a spring loaded piston 109. The spring 111 bears against the connection points 107 at one end and against an internal wall 113 at the other end for urging the piston 109 in a direction towards aperture 101.

In operation, an internal solenoid of the mechanism 9 is actuated for withdrawing the piston 109 against the force of spring 111 such that gripper elements 103A and 103B are urged together and inward of the aperture 101. When in the withdrawn position, the distance between remote ends of the gripper elements 103A and 103B is sufficiently small to fit through the central aperture of compact disc 7 (as shown in dashed outline in FIG. 15). Thereafter, the internal solenoid is de-energized, such that spring 111 urges piston 109 forward, causing the gripper elements 103A and 103B to spread apart under the force of the rods 105, thereby securely gripping the compact disc 7. In this way, the compact disc 7 may be alternately grasped and released for maneuvering the disc into position relative to compact disc player 2.

Figure 16A:
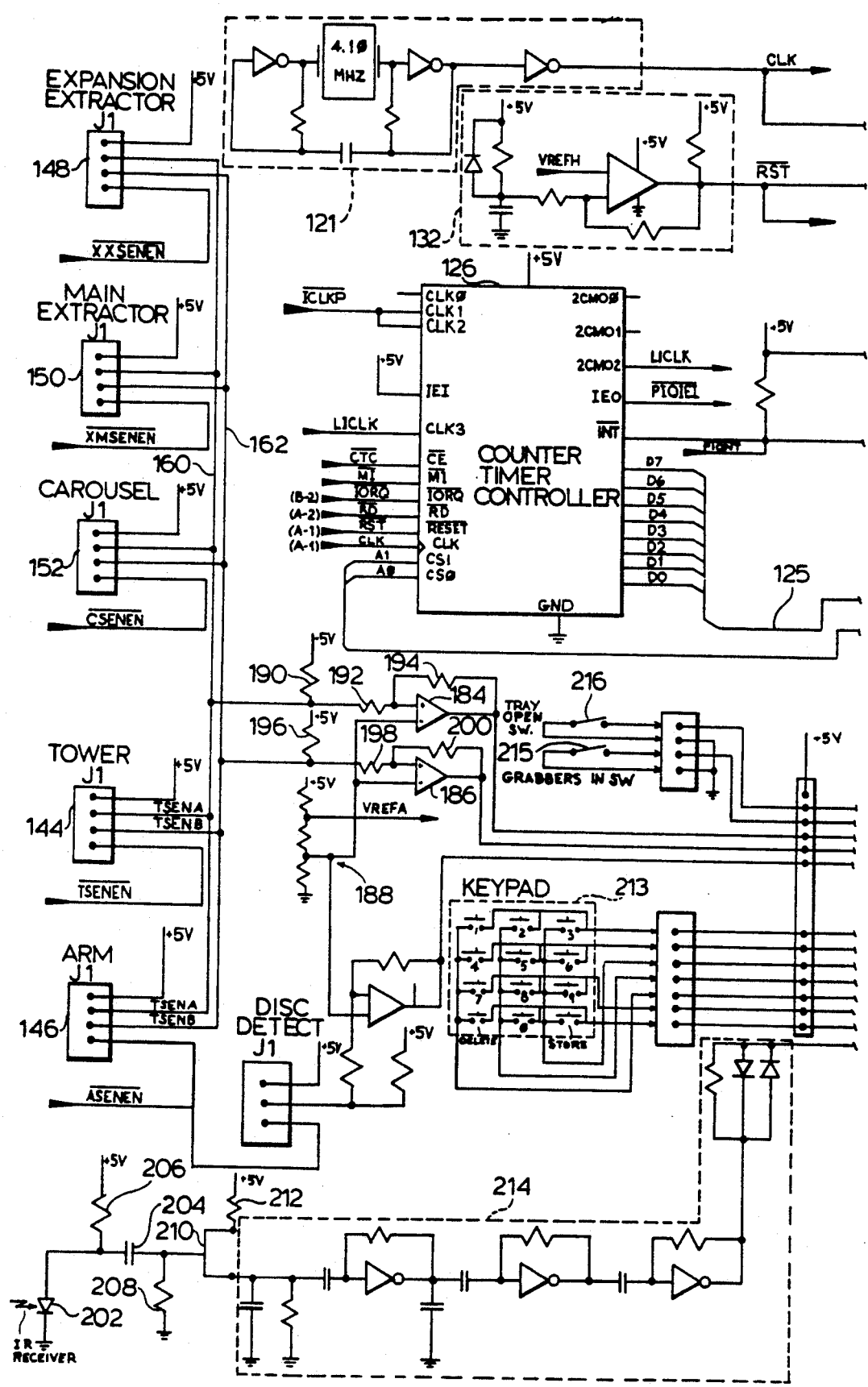

Turning now to FIGS. 16A and B, 17 and 18, electronic circuitry is illustrated for controlling operation of the CD loader according to the present invention.

With reference to FIGS. 16A and B, a microprocessor 120 is provided with an 8K×8 EPROM memory 122 for program storage and an 2K×8 static RAM 124 for storing user entered parameters. A counter timer controller (CTC) 126 and peripheral input/output device (PIO) 128 are connected to the microprocessor 120 in a well known manner.

Microprocessor 120 receives a timing clock signal from a clock signal generating signal circuit 121, in a well known manner.

Various control signals are transmitted between the microprocessor 120, EPROM 122, RAM 124, PIO 128, in a well known manner. Such control signals include $\overline{PIO}$, $\overline{MI}$, $\overline{IOR2}$, $\overline{RD}$, CLK, PIOIE2, LICLK, $\overline{CTC}$, $\overline{IORQ}$, $\overline{RST}$, etc.

The microprocessor 120, counter timer controller 126 and PIO 128 are configured to support a prioritized, interactive interrupt servicing load which, according to the preferred embodiment, is in the form of a Zilog Z80 interrupt mode 2. According to the interrupt servicing system, the counter timer controller 126 and PIO 128 arbitrate between themselves for priority and the selected one of the CTC 126 or PIO 128 returns a preprogrammed jump vector which is unique to the particular channel or port of the PIO 128 or CTC 126 causing the interrupt to the microprocessor 120.

Figure 18:
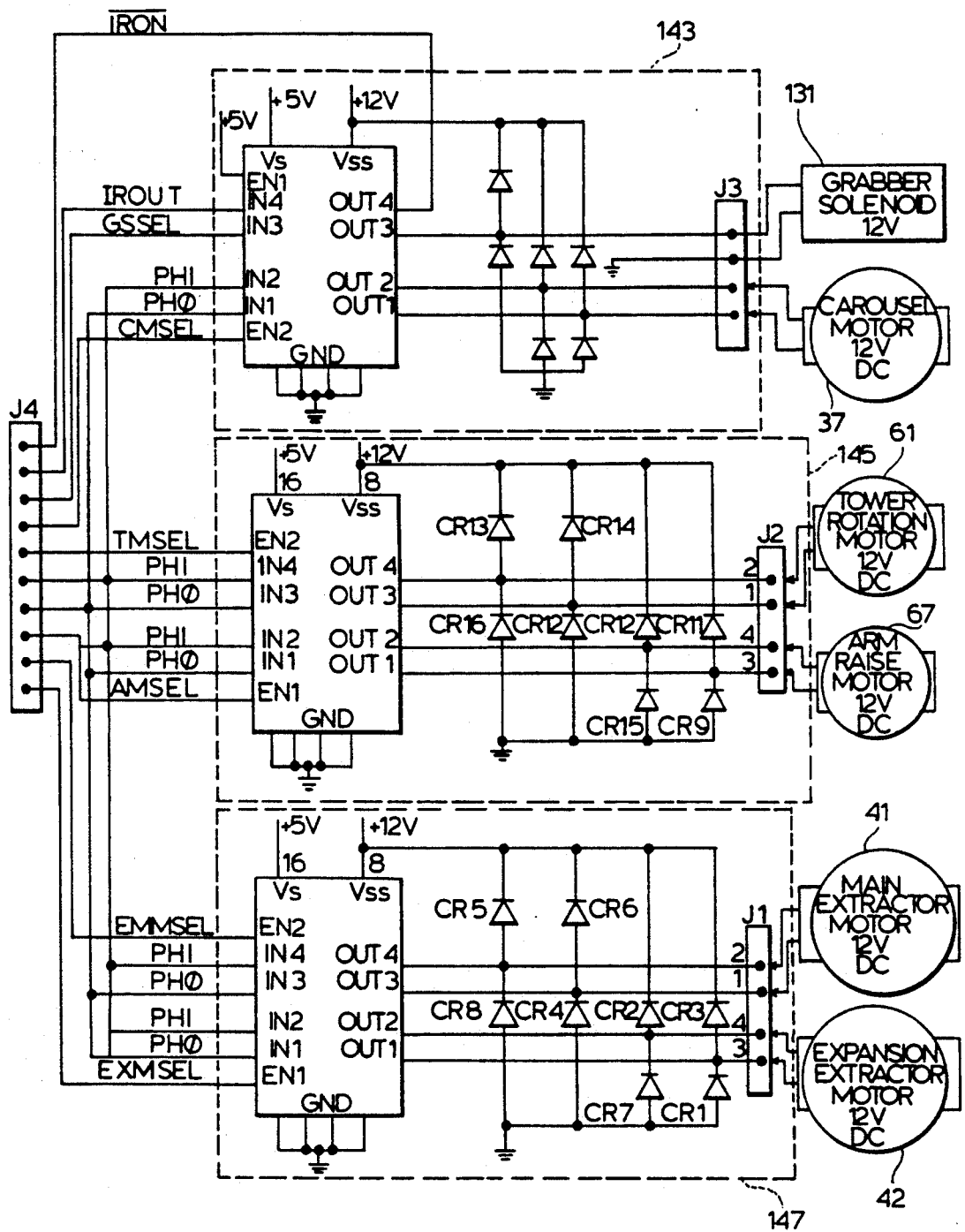

An octal latch 129 has data inputs thereof D0–D7 connected to databus 125 for selecting and controlling DC motors 37, 41, 61, 67 and solenoid 131 (FIG. 18).

The counter timer control (CTC) 126 and PIO 128 are mapped in I/O space via address decoder 130, while the EPROM 122, RAM 124 and motor control latch 129 are mapped in memory space of microprocessor 120. A fourth memory mapped select $\overline{ICLKP}$ is used to clock both channels of the counter timer controller 126. The latch 129 and counter timer controller 126 are memory mapped to avoid false selects which can result during interrupt acknowledge due to the minimal decoding hardware provided by address decoder 130 in accordance with the preferred embodiment.

An address decoder 130 is connected to address lines A2, A3, A14 and A15 of address bus 131 for selectively enabling EPROM 122, RAM 124, counter timer control 126 and PIO 128. In addition, address decoder 130 decodes the high order address bits A14 and A15 for generating a clock signal $\overline{ICLKP}$ which is applied to the CLK1 and CLK2 clock inputs of counter timer controller 126. Address decoder 130 is enabled responsive to signals generated by the MREQ and IORQ outputs of microprocessor 120.

Octal latch 129 is enabled and clocked responsive to the $\overline{MCON}$ signal output from address decoder 130 and may be reset responsive to an $\overline{RST}$ signal generated by reset circuit 132. The reset circuit 132 generates a power-up reset in a well known manner for ensuring that the power level is stable before beginning program execution.

The latch 129 generates a plurality of select signals TMSEL; AMSEL; GSSEL; EXMSEL; EMNSEL and CMSEL which are inverted via buffers 134, 136, 138, 140 and 142 into corresponding enable signals $\overline{TSENEN}$, $\overline{ASENEN}$, $\overline{XXSENEN}$, $\overline{XMSENEN}$, and $\overline{CSENEN}$ for enabling the respective ones of the optical sensors 53A, 53B; 57A, 57B; 49A, 49B; expansion extractor arm (not shown) and optical sensors 45A, 45B via respective terminal blocks 144, 146, 148, 150 and 152 of a connector jack J1.

The inverting buffers 134–142 are preferably configured in the form of respective Darlington arrays for sinking current and turning off the respective pairs of optical interrupters associated with the mechanism moved by the particular motor selected.

Figure 16B:
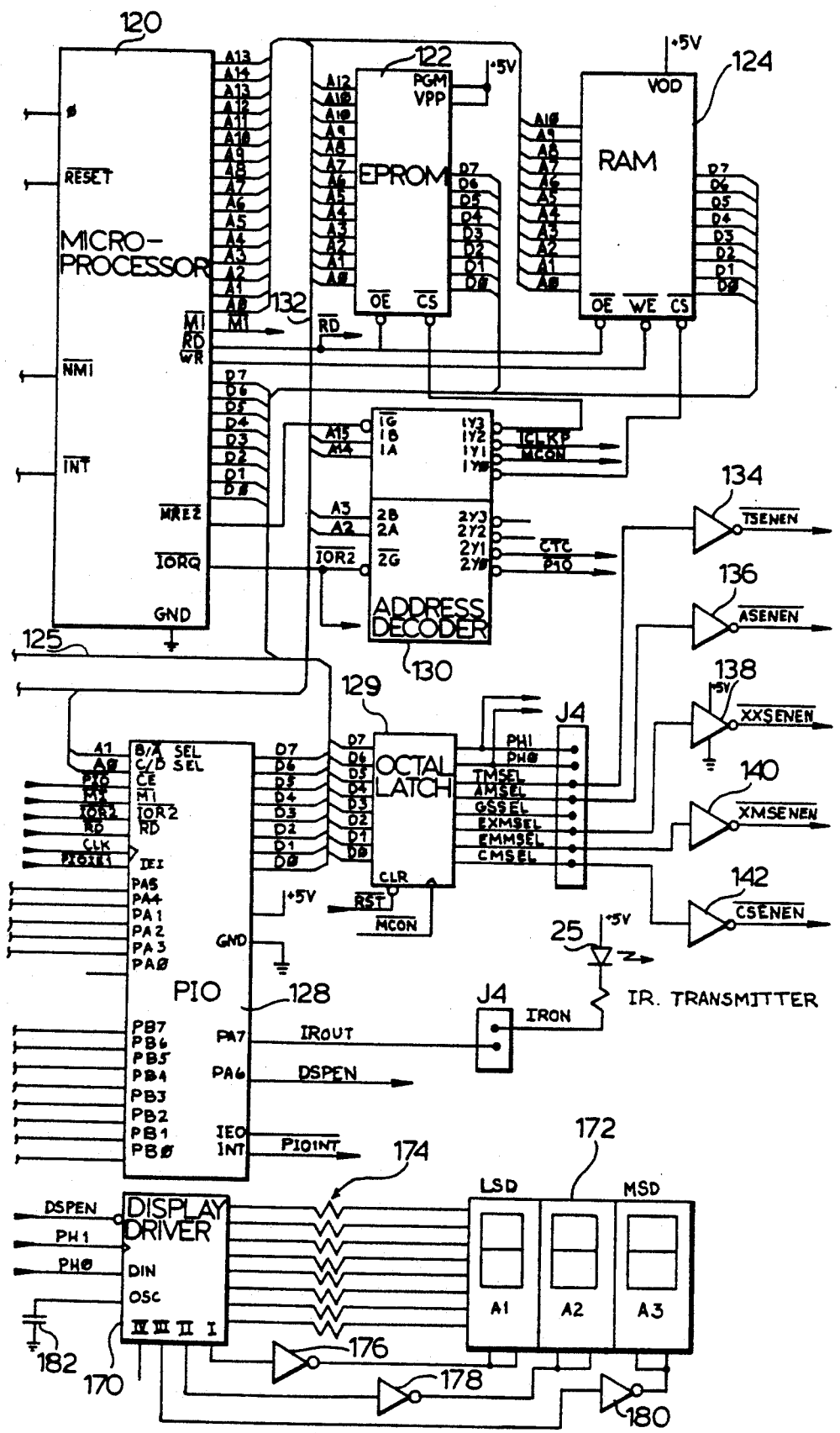
Figure 17:
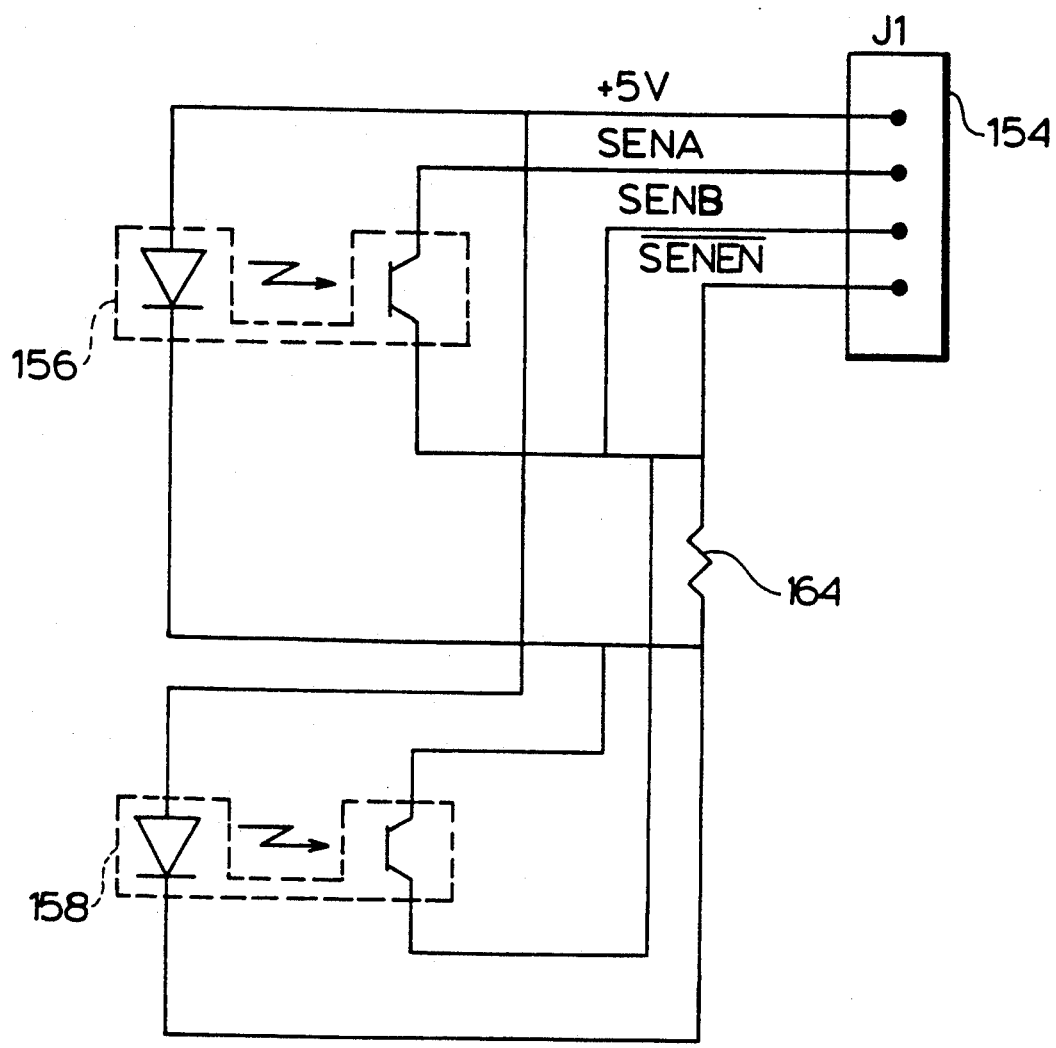

Turning briefly to FIG. 17, a circuit is schematically shown representing the construction of the aforementioned optical sensors. In particular, each of the optical sensors is connected to a terminal block 154 (i.e. equivalent to any one of the blocks 144–152) and comprises a pair of optical interrupters 156 and 158 (i.e. equivalent to any one of the aforenoted pairs of optical interrupters). The outputs SENA and SENB of interrupters 156 and 158 are connected to a further pair of terminals of block 154 which, in turn, are connected to respective signal leads 160 and 162 (FIG. 16A). Each of the optical interrupters 156 is 158 is powered via a +5 volt source connected to the representative terminal block 154 and is enabled via grounding of the appropriate enable signal $\overline{SENSEN}$ which is equivalent to any one of the enable signals output from inverting buffers 134–142, (FIG. 16B). The current limiting resistor 164 is connected between the common emitter terminals of interrupters 156 and 158 and the respective coupled cathode terminals thereof.

Two control signals are used for controlling the operation of the motors 37, 61, 67, 41, and 42 (FIG. 18), the additional expansion extractor motor 42 may be provided for use with a two-tiered carousel in accordance with a modified embodiment of the present invention.

The two control signals PH1 and PH0 output from octal latch 129 are derived from the D6 and D7 databits of databus 125 and used for controlling the motor windings in the respective motors. More particularly, the various motors operate in accordance with the binary values of signals PH1 and PH0 as shown with reference to Table A.

TABLE a

| PH1 | PH0 | RESULT |
|---|---|---|
| 0 | 0 | Coast |
| 0 | 1 | Clockwise Rotation |
| 1 | 0 | Counter-Clockwise Rotation |
| 1 | 1 | Fast Stop |

In other words, variable motor speed is achieved under software control via pulse width modulation of the motor phase signals PH0 and PH1.

The signals PH1 and PH0 are also used to clock display data into a display driver 170 for controlling LED display 172. The display driver 170 is connected to 172 via current limiting resistors shown generally as 174, and enabling buffers 176, 178 and 180.

Display driver 170 is capable of driving four digits by time division multiplexing four enable outputs I, II, III, IV, and the multiplexing frequency is set by an external capacitor 182. These enable outputs are used to turn on Darlington drivers 176, 178 and 180 which sink current from common cathode, seven segment display 172. Eight parallel lines of the display driver 170 drive the seven segments and decimal point of display 172 via current limiting series resistors 174. The display driver 170 is loaded serially via clock signals PH1 and PH0 under program control of microprocessor 126, in a well known manner.

Dual use of the control signals PH1 and PH0 for motor control and display driving, in conjunction with multiplexing of the optical sensors result in considerable economy of circuit layout although only one motor can be on at a time and the display 172 may only be updated when all motors are disabled.

The two channel outputs of optical sensors 156 and 158 (FIG. 17) are carried by data leads 160 and 162, (FIG. 16A) as discussed above. Data lead 160 is connected to the non-inverting input of a comparator 184, and data lead 162 is connected to the non-inverting input of a comparator 186. Respective inverting inputs of comparators 184 and 186 are connected to a source of reference voltage VREFA output from a voltage divider resistor array 188. The comparators 184 and 186 are biased via resistors 190-200 to provide distortion free TTL level output signals via respective outputs thereof. The output signals from comparators 184 and 186 are applied to data terminals PA1 and PA2 of a first parallel port on PIO 128.

Keypad 13 is configured in the form of an X-Y matrix having four row lines with pull-up resistors used as inputs to the PIO 128 via terminals PB0, PB1, PB6 and PB7, and three common lines driven low by terminals PB2-PB5 of PIO 128. Thus, when a key is closed, the associated row line will drop to a logic low level for detection via the PIO 128.

An infrared receiver 202 is shown in the form of a diode which is AC coupled via capacitor 204 and resistors 206 and 208 to a FET transistor 210 with a drain terminal thereof connected via resistor 212 to the plus 5 volt source, and a source terminal connected to a three stage filter 214 having an output connected to the PB0 terminal PIO 128. The filter 214 is configured as a series of CMOS inverter gates.

As discussed above with reference to FIG. 1, an infrared transmitter 25 is provided which, as shown in FIG. 16B, is preferably in the form of a diode 25 connected to a PA7 terminal of PIO 128.

As discussed above, the carousel motor 37, tower rotation motor 61, arm raise motor 67, main extractor motor 41 and expansion extractor motor 42 are used to control mechanism movement within the system of the present invention. Associated with each of the motors is an optical sensor having a pair of optical interrupters (e.g. 156, 158) for detecting motion of such mechanism. The spacial relationship of the optical interrupters is as shown with reference to FIG. 5-7. More particularly, the spacing between respective ones of the optical interrupters may be expressed as (N/2)×slot pitch, where N is an odd number and large enough to accommodate the width of each optical interrupter. As the mechanism moves, the slots cause the optical interrupters 156, 158 to pulse alternately.

These pulse signals ar detected by PIO 128 via comparators 184 and 186. In response, PIO 128 presents data representative of the pulsations to microprocessor 128 which, in turn, executes a "debouncing" algorithm for ignoring any mechanism jitter (i.e. pulsing of only one interrupter) provided that the magnitude of the jitter is less than one-half of the slot pitch. In addition, a slight displacement of any movable mechanism when not being driven will be ignored in the event that the magnitude is less one half of the slot pitch.

For example, in the event that the mechanism is halted such that interrupter 156 is over a slot, then any subsequent motion in either direction will cause sensor 158 to pulse. Therefore, in the event that the mechanism is jostled off-slot while idle, it doesn't matter if the slot is to the left or the right (clockwise or counter-clockwise) of sensor 156 since sensor 158 is polled by microprocessor 120 expecting to receive the next pulse. Hence, any erroneous pulse from interrupter 156 is ignored.

As previously discussed, at one end of each slotted section 43, 47, 55, 51, is an extended slot configured such that when the interrupter pair 156, 158 is over the extended slot area, both sensors 156 and 158 generate an output signal. This defines a unique situation throughout the range of travel of the mechanism and designates the "home" position of the mechanism. This coincides with a mechanical stop or "end of travel", and all motion is referenced to the "home" position.

Equal spacing between the various slots allows microprocessor 120 to calculate real time speed of motion of the mechanism by counting sensor pulse periods referenced to an internal time base.

In addition to the optical sensors discussed above, a pair of microswitches 216 and 215 are used to detect the position of the CD tray 19 and grabber arm 9. More particularly, in the event that the grabber solenoid 131 has pulled grabber arms 103A, 103B inward, switch 215 is closed. Similarly, in the event that the tray 19 is open, switch 216 is closed. The open/close status of switches 216 and 218 is detected via PIO 128 through terminals PA4 and PA5 in a well known manner.

Although not shown, the microswitches 215 and 216 are positioned relative to the grabber arm 9 and CD tray 19, respectively, to permit detection of movement.

In operation, after power-up or reset, microprocessor 120 executes a program stored in EPROM 122 for initializing counter timer controller 126, PIO 128 and display driver 170. Keypad interrupts of PIO 128 are then enabled and the program halts until receipt of an interrupt due to closure of one of the keys on keypad 13 (i.e. keypad 213 in FIG. 16A).

Depression of any key on keypad 13 results in a do-nothing service routine executed by microprocessor 120 and, after return from interrupt, the main program in EPROM 122 is executed by microprocessor 120 until occurrence of a reset.

The main control program sets up the aforementioned service routine for functional keypad input and enables remote control interrupts. The main program then enters a loop whereby a play request queue is monitored for entries. When an entry appears (e.g. switches on keypad 13 are closed or a remote control service routine is executed by virtue of receipt of infrared signals on IR receiver 202), the main program of microprocessor 120 calls a series of sub-routine drivers which install predetermined interrupter vectors and sequence operation of motors 37, 61, 67, 41, 42 and grabber solenoid 131 to accomplish the requested task.

While the interrupt routines control the sensor/motor interaction and user interface, the main program subroutines calculate motor speed parameters and set predetermined software timers for detecting jammed mechanisms, stripped gears, etc.

Upon completion of the interrupt routines, the queue is updated and the queue is re-entered.

Turning to FIG. 18, each of the motors 37, 61, 67, 41, 42 and solenoid 131 are driven by monolithic dual full-bridge drivers 143, 145 and 147, and receive respective control signals from terminal block J4.

In the event that a particular one of the motors 37, 61, 67, 41 or 42 is in operation, the real time clock service routine executed by microprocessor 120 checks a predetermined stored motor speed request parameter and compares it to the clock signal to see if the motor should be on or off for the next microprocessor time interval (512 microseconds). It is important to note that the various optical sensors actually monitor mechanism motion as opposed to motor motion, for ensuring proper functioning (i.e. no jamming or slippage) of the system.

Once motion of the mechanism is initiated, an interval timer is set to a prescribed pulse period. In the event that the interval timer expires, then the mechanism is judged to be moving at an overly slow rate. The service routine increments the service speed parameter and sets a flag (e.g. "motor too slow") indicating that the speed has been incremented.

When the optical sensors generate alternating pulses in the manner discussed above, the service routine monitors for the "motor too slow" flag signal. In the event that the flag is not set, then the time remaining on the interval timer is checked. If the time is too great, then the mechanism is deemed to be moving too quickly and the motor speed parameter is decremented. The extent of what constitutes excessive speed is determined by the mechanical delays in the control system. The interval timer is then reset for the next interval and the "motor too slow" flag signal is cleared.

Reference will now be made to the drawings in considering user operation of the compact disc loader of the present invention.

Operation of the system may be effected by one either keypad 13 or a remote infrared transmitter whose signals are received via IR receiver 202 (FIG. 16A). In order to install a compact disc, the disc is manually loaded into CD player 2. A "STORE" button on keypad 13 or the remote control unit is then pushed such that display 172 shows a series of blanks. By pushing "STORE" again, the display 172 shows ---. The user then selects the number of an available slot in carousel 11 and enters that number via the keypad or remote unit (e.g. for slot 1, enter 001).

Next, the number of minutes (i.e. duration) of the disc may be read from the front panel of the CD player 2. This number is then entered via the keypad or remote control unit.

The number of seconds in addition to the number of minutes duration may then be read from the front panel of the CD player 2 and entered via the keypad or remote control.

At this point, the CD loading system accesses the selected slot number by means of loader 37 rotating the carousel 11 to the required position. The compact disc is retrieved and stored in the assigned slot. In the event that the selected slot number is not available, the display illustrates "000" and the system awaits entry of a new slot number.

In order to remove a disc from the system, the user presses a "DELETE" button on keyboard 13 or the remote control unit. The display 172 illustrates a series of blanks. By depressing the "DELETE" button a second time, the display 172 shows ---. The disc number is then entered (i.e. the disc number being equivalent to the slot number).

The system then automatically accesses the selected slot and the stored compact disc is presented via extractor arm 15.

The user then removes the disc 7 from extractor arm 15 and pushes the "DELETE" button again. The display 172 reverts to "000" and the extractor arm 15 is withdrawn into the housing 1.

In the event that the selected disc number is not present, the display generates "000" and the cycle is terminated.

The delete cycle can be aborted by leaving the disc on the extractor mechanism 15 and pushing "STORE". In this situation, the display 172 generates "000", extractor arm 15 withdraws, and the disc is restored in the same slot from which it was retrieved on carousel 11.

In order to play a disc, the user enters the three digit disc number via keypad 13 or remote control unit. The disc is accessed via rotation of carousel 11 by a predetermined amount, loading of the compact disc into CD player 2 as discussed in detail above, and initiation of play via control signals generated from transmitter 25 and received via receiver 27 of the player 2. Once the selected disc has finished playing, the compact disc loader of the present remains "dormant" until a new selection is made. In the "dormant" mode of operation, the disc remains in the player, extractor arm 15 is extended, arm 5 is retained in the volume control position shown in solid lines of FIG. 9 and the disc number is displayed at 172.

Once a new disc number has been entered by the user, the previous disc is retrieved from the CD player 2 and restored in its designated slot position, the carousel 11 rotates to the new selection slot and the sequence begins again.

In order to play a succession of from 2 to 250 discs in sequence (or from 2 to 500 discs with the two-tiered expansion carousel), the user depresses the "STORE" button, enters the first and successive three digit disc numbers while display 172 depicts a running count of the total number of discs selected. To terminate the entry session, the user pushes "STORE" button again.

The display 172 then generates the three digits of the first disc selected, the disc is loaded and play is initiated.

After the disc time for the first disc has elapsed (i.e. the duration in minutes previously stored when the disc was initially installed into the system), the next disc is loaded and play is again initiated.

During any entry session, the "DELETE" button may be used to erase errors. Likewise, to remove a selection from the play queue, the "DELETE" button may be depressed and the three digit number for the disc to be deleted may be thereafter entered.

In order to abort a play session, the DELETE button may be depressed and "000" is then entered.

While in sequential play mode, the IR receiver 202 under control PIO 128 and microprocessor 120, monitors for signals from the CD player remote control. Thus, the remote control may be used to effect volume, etc.

The detailed description hereinabove is directed at a preferred embodiment of the present invention. Numerous other embodiments or modifications are possible. For example, the principles of the present invention may be extended to storage and retrieval of computer discs for use with a computer digital audio tapes, or other recorded media. All such embodiments or modifications are believed to be within the scope of the claims appended hereto.

I claim:

1. A compact disc storage and retrieval device, comprising:
   a) a housing for supporting a compact disc player;
   b) means within said housing for storing a plurality of compact discs;
   c) user responsive means for retrieving a predetermined one of said plurality of compact discs from said means for storing, loading said predetermined compact disc into said player, and generating predetermined control signals for controlling operation of said disc player;
      wherein said user responsive means further comprises:
   d) means for locating said predetermined compact disc within said means for storing;
   e) means for extracting said predetermined compact disc from said means for storing;
   f) means for opening a disc tray of said player;
   g) means for lifting and rotating said predetermined compact disc to a position over said tray and releasing said compact disc such that said compact disc is placed on said tray; and
   h) means for closing said tray;
      wherein said means for storing comprises a carousel having a plurality of vertical slots for holding successive ones of said plurality of compact discs in vertical orientation;
      wherein said means for extracting comprises an aperture in said housing, a horizontal member within said housing having a slot through which said carousel is adapted to rotate and a grooved opening dimensioned to receive and support said predetermined compact disc on said carousel, and means for sliding said horizontal member and compact disc supported thereby radially outward relative to said carousel and through said aperture;
      wherein said means for lifting comprises;
   i) a vertical tower member disposed adjacent said housing;
   j) an arcuate arm connected to and projecting from said tower member;
   k) means for raising and rotating said arm such that said predetermined compact disc is lifted and rotated from a first position in said vertical orientation adjacent said aperture to a second raised position in horizontal orientation;
   l) means for rotating said tower such that said predetermined compact disc advances to said position over said tray;
   m) means for locking said arm such that said compact disc is maintained in said horizontal orientation;
   n) a gripper element connected to a distal end of said arm for gripping said predetermined compact disc at said first position and releasing said compact disc at said position on said tray,
      wherein said means for opening and said means for closing said disc tray of said player comprise an axial member mounted within said tower member having a first extension disposed adjacent to a tray actuation button of said compact disc player and second extension disposed adjacent to said means for raising and rotating said arm, said axial member being adapted to rotate responsive to said second extension being lifted by said means for raising whereby said first extension is caused to depress said tray actuation button for alternatively opening and closing said tray.

2. A compact disc storage and retrieval device, comprising;
   a) a housing for supporting a compact disc player;
   b) means within said housing for storing a plurality of compacts discs;
   c) user responsive means for retrieving a predetermined one of said plurality of compact discs from said means for storing, loading said predetermined compact disc into said player, and generating predetermined control signals for controlling operation of said disc player, wherein said user responsive means further comprises:
   d) means for locating said predetermined compact disc within said means for storing;
   e) means for extracting said predetermined compact disc from said means for storing;
   f) means for opening a disc tray of said player;
   g) means for lifting and rotating said predetermined compact disc to a position over said tray and releasing said compact disc such that said compact disc is placed on said tray;
   h) means for closing said disc tray,
   i) wherein said means for storing comprises a carousel having a plurality of vertical slots for holding successive ones of said plurality of compact discs in vertical orientation,
   j) wherein said means for extracting comprises an aperture in said housing, a horizontal member within said housing having a slot through which said carousel is adapted to rotate and a grooved opening dimensioned to receive and support said predetermined compact disc on said carousel, and means for sliding said horizontal member and compact disc supported thereby radially outward relative to said carousel and through said aperture, and
   (k) wherein said means for extracting further comprises a linear track mounted to said horizontal member, said track comprising a plurality of equidistant slots and a single extended slot defining a home position of said horizontal member, optical sensor means mounted across said track, memory means for storing a predetermined count value representative of the distance travelled by said horizontal member upon sliding thereof radially outward relative to said carousel through said aperture, and means connected to said optical sensor means and memory means for counting said slots upon said sliding of said horizontal member and stopping said sliding of said horizontal member upon counting to said predetermined count value.

3. A compact disc storage and retrieval device, comprising;
   a) a housing for supporting a compact disc player;
   b) means within said housing for storing a plurality of compacts discs;
   c) user responsive means for retrieving a predetermined one of said plurality of compact discs from said means for storing, loading said predetermined compact disc into said player, and generating predetermined control signals for controlling operation of said disc player,
d) means for locating said predetermined compact disc within said means for storing;
e) means for extracting said predetermined compact disc from said means for storing;
f) means for opening a disc tray of said player;
g) means for lifting and rotating said predetermined compact disc to a position over said tray and releasing said compact disc such that said compact disc is placed on said tray;
h) means for closing said tray,
i) wherein said means for storing comprises a carousel having a plurality of vertical slots for holding successive ones of said plurality of compact discs in vertical orientation,
j) wherein said means for extracting comprises an aperture in said housing, a horizontal member within said housing having a slot through which said carousel is adapted to rotate and a grooved opening dimensioned to receive and support said predetermined compact disc on said carousel, and means for sliding said horizontal member and compact disc supported thereby radially outward relative to said carousel and through said aperture,
wherein said means for lifting comprises:
k) a vertical tower member disposed adjacent said housing;
l) an arcuate arm connected to and projecting from said tower member;
m) means for raising and rotating said arm such that said predetermined compact disc is lifted and rotated from a first position in said vertical orientation adjacent said aperture to a second raised position in horizontal orientation;
n) means for rotating said tower such that said predetermined compact disc advances to said position over said tray;
o) means for locking said arm such that said compact disc is maintained in said horizontal orientation; and
p) a gripper element connected to a distal end of said arm for gripping said predetermined compact disc at said first position and releasing said compact disc at said position on said tray,
q) where said means for raising further includes a linear track mounted thereto, said track comprising a plurality of equidistant slots and a single extended slot defining said first position of said arcuate arm, optical sensor means mounted across said track, memory means for storing a predetermined count value representative of the distance travelled by said arcuate arm, and means connected to said optical sensor means and said memory means for counting said slots during raising and rotation of said arcuate arm and stopping said raising and rotation of said arm at said second position upon counting to said predetermined count value.

4. A compact disc storage and retrieval device, comprising;
a) a housing for supporting a compact disc player;
b) means within said housing for storing a plurality of compacts discs;
c) user responsive means for retrieving a predetermined one of said plurality of compact discs from said means for storing, loading said predetermined compact disc into said player, and generating predetermined control signals for controlling operation of said disc player, wherein said user responsive means further comprises:
d) means for locating said predetermined compact disc within said means for storing;
e) means for extracting said predetermined compact disc from said means for storing;
f) means for opening a disc tray of said player;
g) means for lifting and rotating said predetermined compact disc to a position over said tray and releasing said compact disc such that said compact disc is placed on said tray;
h) means for closing said disc tray,
i) wherein said means for storing comprises a carousel having a plurality of vertical slots for holding successive ones of said plurality of compact discs in vertical orientation,
j) wherein said means for extracting comprises an aperture in said housing, a horizontal member within said housing having a slot through which said carousel is adapted to rotate and a grooved opening dimensioned to receive and support said predetermined compact disc on said carousel, and means for sliding said horizontal member and compact disc supported thereby radially outward relative to said carousel and through said aperture,
wherein said means for lifting comprises:
k) a vertical tower member disposed adjacent said housing;
l) an arcuate arm connected to and projecting from said tower member;
m) means for raising and rotating said arm such that said predetermined compact disc is lifted and rotated from a first position in said vertical orientation adjacent said aperture to a second raised position in horizontal orientation;
n) means for rotating said tower such that said predetermined compact disc advances to said position over said tray; and
o) means for locking said arm such that said compact disc is maintained in said horizontal orientation; and
p) a gripper element connected to a distal end of said arm for gripping said predetermined compact disc at said first position and releasing said compact disc at said position on said tray,
q) wherein said means for rotating said tower further includes a circular track mounted to said tower, said track comprising a plurality of circumferentially equidistant slots and a single extended slot defining a start position of said tower, optical sensor means mounted across said track, memory means for storing a predetermined count value representative to the amount of rotation of said tower, and means connected to said optical sensor means and said memory means for counting said slots during rotation of said tower and stopping rotation of said carousel upon counting to said predetermined count value.

5. A compact disc storage and retrieval device, comprising;
a) a housing for supporting a compact disc player;
b) means within said housing for storing a plurality of compacts discs;
c) user response means for retrieving a predetermined one of said plurality of compact discs from said means for storing, loading said predetermined compact disc into said player, and generating predetermined control signals for controlling operation of said disc player, wherein said user responsive means further comprises:

d) means for locating said predetermined compact disc within said means for storing;

e) means for extracting said predetermined compact disc from said means for storing;

f) means for opening a disc tray of said player;

g) means for lifting and rotating said predetermined compact disc to a position over said tray and releasing said compact disc such that said compact disc is placed on said tray;

h) means for closing said disc tray, i) wherein said means for storing comprises a carousel having a plurality of vertical slots for holding successive ones of said plurality of compact discs in vertical orientation, wherein said means for locating comprises:

j) means for rotating said carousel;

k) a circular track mounted to said carousel, said track comprising a plurality of circumferentially equidistant slots and a single extended slot defining a home position of said carousel;

l) optical sensor means mounted across said track;

m) memory means for storing a predetermined count value representative of said predetermined compact disc in said carousel; and n) means connected to said optical sensor means and said memory means for counting said slots during rotation of said carousel and stopping rotation of said carousel upon counting to said predetermined count value, wherein said optical sensor means further comprises a pair of optical interrupters each being of a predetermined width mounted across said track for generating respective pulse signals representative of said slots during rotation of said carousel, said pair of optical interrupters being circumferentially offset by a predetermined spacing of P(N/2), where P is the pitch of said slots and N is an odd number of sufficient magnitude to accommodate said width of each said optical interrupter.

6. The device of claim 5, wherein said means for counting further comprises means for alternately polling said pair of optical interrupters for receiving and counting successive ones of said pulses generated by said pair of optical interrupters, and ceasing counting said pulses generated by either one of said pair of optical interrupters in the event the other of said pair of optical interrupters ceases generating pulses.

* * * * *